United States Patent
Beavin et al.

(10) Patent No.: US 7,970,756 B2
(45) Date of Patent: *Jun. 28, 2011

(54) GENERALIZED PARTITION PRUNING IN A DATABASE SYSTEM

(75) Inventors: Thomas Abel Beavin, Milpitas, CA (US); Sauraj Goswami, Palo Alto, CA (US); Terence Patrick Purcell, New Berlin, IL (US)

(73) Assignee: International Business Machines Corporation, Armonk, NY (US)

( * ) Notice: Subject to any disclaimer, the term of this patent is extended or adjusted under 35 U.S.C. 154(b) by 250 days.

This patent is subject to a terminal disclaimer.

(21) Appl. No.: 12/268,391

(22) Filed: Nov. 10, 2008

(65) Prior Publication Data

US 2009/0070303 A1 Mar. 12, 2009

Related U.S. Application Data

(63) Continuation of application No. 11/242,951, filed on Oct. 4, 2005, now Pat. No. 7,461,060.

(51) Int. Cl.
*G06F 7/00* (2006.01)
*G06F 17/30* (2006.01)

(52) U.S. Cl. ........................ 707/718; 707/803

(58) Field of Classification Search ........... 707/999.002, 707/711, 718, 803
See application file for complete search history.

(56) References Cited

U.S. PATENT DOCUMENTS

| | | | |
|---|---|---|---|
| 5,664,172 A | 9/1997 | Antoshenkov | |
| 5,794,229 A | 8/1998 | French et al. | |
| 6,006,220 A * | 12/1999 | Haderle et al. | 1/1 |
| 6,014,656 A | 1/2000 | Hallmark et al. | |
| 6,081,799 A | 6/2000 | Beavin et al. | |
| 6,092,062 A * | 7/2000 | Lohman et al. | 1/1 |
| 6,125,370 A | 9/2000 | Courter et al. | |
| 6,269,375 B1 * | 7/2001 | Ruddy et al. | 1/1 |
| 6,272,498 B1 | 8/2001 | Muthukrishnan et al. | |
| 6,374,232 B1 | 4/2002 | Dageville et al. | |
| 6,439,783 B1 * | 8/2002 | Antoshenkov | 1/1 |
| 7,756,889 B2 * | 7/2010 | Yu et al. | 707/774 |
| 7,774,379 B2 * | 8/2010 | Basu et al. | 707/803 |
| 2002/0194157 A1 | 12/2002 | Zait et al. | |
| 2003/0208503 A1 | 11/2003 | Roccaforte | |
| 2004/0044662 A1 | 3/2004 | Ganesan et al. | |
| 2004/0148293 A1 | 7/2004 | Croisettier et al. | |
| 2004/0199533 A1 | 10/2004 | Celis et al. | |
| 2004/0215638 A1 | 10/2004 | Kapoor et al. | |
| 2004/0249845 A1 | 12/2004 | Das | |
| 2005/0038784 A1 | 2/2005 | Zait et al. | |
| 2006/0253429 A1 | 11/2006 | Raghavan et al. | |
| 2011/0029557 A1 * | 2/2011 | Raghavan et al. | 707/769 |

OTHER PUBLICATIONS

Maurice Bernader, "Basis of a Fuzzy Knowledge Discovery System", 2000, Springer (Abstract only).

* cited by examiner

*Primary Examiner* — Mohammad Ali
*Assistant Examiner* — Brannon W Smith
(74) *Attorney, Agent, or Firm* — Sawyer Law Group, P.C.

(57) ABSTRACT

A system for executing a query on data that has been partitioned into a plurality of partitions is provided. The system includes providing partitioned data including one or more columns and the plurality of partitions. The partitioned data includes a limit key value associated with each column for a given partition. The system further includes receiving a query including a predicate on one of the one or more columns of the partitioned data; and utilizing the predicate on the one of the one or more columns in a pruning decision on at least one of the one or more partitions based on the limit key values associated with the plurality of partitions.

10 Claims, 3 Drawing Sheets

— 200

| LIMIT KEYS ( c1, c2, c3 ) | PARTITION NUMBER |
|---|---|
| ( 1000, 10, 1 ) | 1 |
| ( 1000, 10, 5 ) | 2 |
| ( 1000, 20, 1 ) | 3 |
| ( 1000, 20, 5 ) | 4 |
| ( 1000, 30, 1 ) | 5 |
| ( 1000, 30, 5 ) | 6 |

| LIMIT KEYS (c1, c2, c3) | PARTITION NUMBER |
|---|---|
| (1000, 10, 1) | 1 |
| (1000, 20, 5) | 2 |
| (1000, 30, 1) | 3 |
| (1000, 40, 5) | 4 |
| (1000, 50, 1) | 5 |
| (1000, 60, 5) | 6 |

| LIMIT KEYS (c1, c2, c3) | PARTITION NUMBER |
|---|---|
| (1, 2, 4) | 1 |
| (1, 2, 6) | 2 |
| (1, 2, 8) | 3 |
| (1, 3, 6) | 4 |
| (1, 3, 12) | 5 |
| (1, 3, 14) | 6 |

| LIMIT KEYS (c1, c2, c3) | PARTITION NUMBER |
|---|---|
| (2001, 1, 15) | 1 |
| (2001, 1, 30) | 2 |
| (2001, 2, 15) | 3 |
| (2001, 2, 27) | 4 |
| (2001, 3, 15) | 5 |
| (2001, 2, 30) | 6 |

702 — PROVIDE PARTITIONED DATA INCLUDING $n$ COLUMNS AND $k$ PARTITIONS, WHERE $k$ IS AN INTEGER > 1 AND $n$ IS AN INTEGER > 1

704 — RECEIVE A QUERY INCLUDING A PREDICATE ON COLUMN $i$, WHERE $i$ IS AN INTEGER GREATER THAN OR EQUAL TO 1

706 — UTILIZE THE PREDICATE ON COLUMN $i$ IN A PRUNING DECISION ON AT LEAST ONE OF THE $k$ PARTITIONS

GENERALIZED PARTITION PRUNING IN A DATABASE SYSTEM

CROSS-REFERENCE TO RELATED APPLICATIONS

Under 35 USC §120, this application is a continuation application and claims the benefit of priority to U.S. patent application Ser. No. 11/242,951, filed on Oct. 4, 2005, entitled "GENERALIZED PARTITION PRUNING IN A DATABASE SYSTEM" which is incorporated herein by reference.

FIELD OF THE INVENTION

The present invention relates generally to database systems, and methods for optimizing queries in database systems.

BACKGROUND OF THE INVENTION

Database systems store, retrieve, and process information. One type of database system is a relational database. In a relational database, the relationship of data are usually maintained in a table having rows and columns. The rows organize instances of related data, and the columns group data having common characteristics or attributes.

The operation of locating data in a database system is called a query. Typically, queries are expressed in a query language, e.g., structured query language (SQL). In a query, the expressions which determine the search criteria are called predicates. Predicates can be phrased in terms of a range of values, for example, greater than (>), less than or equal ($\leq$), equal (=), between, and the like. Predicates can further include mathematical relationships. Predicates can also be related by logical operators, for example, AND (Λ), OR (V), NOT (¬), and the like.

Processing queries is typically a time consuming task since a database system can include a large amount of data, and a given query may need to retrieve data from different portions of a database system. Conventional database systems, therefore, typically include a query optimizer that transforms a given query into an equivalent optimized query which may be processed more efficiently than the given query. In addition, to more efficiently handle large amounts of data, tables and indexes within a database system can be partitioned.

With respect to indexes (e.g., partitioned indexes and non-partitioned indexes), conventional database systems, however, generally impose restrictions on the nature of predicates that can be utilized by a query optimizer on an index. That is, conventional query optimizers typically use only matching predicates. A matching predicate is either an inequality on the first column of a multi-column index, or a matching predicate could involve equalities on the first few columns of a multi-column index followed by an inequality with no gaps. So, for example, if an index has four columns $c_1, c_2, c_3, c_4$, then $c_1=5$ and $c_2=10$ and $c_3>=15$ is a matching predicate. On the other hand $c_1=5$ and $c_2=10$ and $c_4>=15$ is not a matching predicate since there is a gap between $c_2$ and $c_4$. In this case we can use $c_1=5$ and $c_2=10$ as a matching predicate. However, on many occasions predicates other than matching predicates—e.g., screening predicates or stage 1 predicates—could potentially be used for partition pruning.

Accordingly, what is needed is a query optimizer that can provide greater partition pruning ability than conventional query optimizers, including utilizing predicates on columns other than a leading column, e.g., screening predicates or stage 1 predicates, to determine partitions that need to be scanned, and hence partitions that can be pruned, to satisfy a query. The present invention addresses such a need.

BRIEF SUMMARY OF THE INVENTION

In general, in one aspect, this specification describes a system for executing a query on data that has been partitioned into a plurality of partitions. The system includes providing partitioned data including n columns and k partitions, where k is an integer greater than (1) and n is an integer greater than (1). The partitioned data includes a limit key value associated with each of the n columns for a given k partition. The method further includes receiving a query including a predicate on column i of the partitioned data, where i is an integer greater than or equal to (1), and utilizing the predicate on column i in a pruning decision on at least one of the k partitions based on the limit key values associated with the k partitions.

Particular implementations can include one or more of the following features. The predicate on column i can also be utilized in a pruning decision on a given partition k if: $p_{k-1,j}=p_{k,j}$ for $j=1$ to $i-1$, where $p_{k,j}$ represents a limit key value for column j of partition k. The given partition k can provide a bounded range $(p_{k-1,i}, p_{k,i}]$ for values in column ci. The predicate on column i can be utilized in a pruning decision on a given partition k if: $p_{k-1,j}=p_{k,j}$ for $j=1$ to $i-2$ and $\text{succ}(p_{k-1,i-1})=p_{k,i-1}$, where $p_{k,j}$ represents a limit key value for column j of partition k and succ( ) is a succeeding operator. The given partition k can provide a bounded range $(p_{k-1,i}, uci] \cup [lci, p_{k,i}]$ for values in column ci, where lci and uci represent the lower bound and the upper bound, respectively, for values of ci. Providing partitioned data can include providing a partitioned index or a partitioned table associated with a relational database. The method can further include inferring a pseudo-partition having one or more limit key values based on the predicate, and generating a bounded range for column values in a given partition k based on the limit key values of the pseudo-partition. Receiving a query can include receiving a query including a predicate having a host variable. Utilizing the predicate can include utilizing the predicate in a pruning decision at compile time to prune at least one of the k partitions prior to resolving the host variable.

In general, in another aspect a computer program for executing a query on data that has been partitioned into a plurality of partitions is provided. The computer program comprises instructions operable to cause a programmable processor to provide partitioned data including n columns and k partitions. The partitioned data includes a limit key value associated with each of the n columns for a given k partition, where k is an integer greater than (1) and n is an integer greater than (1). The computer program further comprises instructions to receive a query including a predicate on column i of the partitioned data, where i is an integer greater than or equal to (1); and utilize the predicate on column i in a pruning decision on at least one of the k partitions based on the limit key values associated with the k partitions.

In general, in another aspect, this specification describes a system including a database configured to provide partitioned data including n columns and k partitions. The partitioned data includes a limit key value associated with each of the n columns for a given k partition, where k is an integer greater than (1) and n is an integer greater than (1). The database is further configured to receive a query including a predicate on column i of the partitioned data, where i is an integer greater than or equal to (1). The system further includes a query optimizer configured to utilize the predicate on column i in a pruning decision on at least one of the k partitions based on the limit key values associated with the k partitions.

Implementations may provide one or more of the following advantages. A query optimizer is provided that can disqualify a greater number of partitions that need to be scanned to satisfy a query than conventional query optimizers. In addition, for queries that include predicates having host variables, for some conditions partitions can be pruned at compile time without having to wait for the host variable to be resolved (e.g., a run-time). In addition "pseudo-partitions" can be inferred (based on limit key distributions of various partitions as well as the predicates themselves) that more thinly slice an existing partition, thereby providing more opportunities for pruning.

The details of one or more implementations are set forth in the accompanying drawings and the description below. Other features and advantages will be apparent from the description and drawings, and from the claims.

DETAILED DESCRIPTION OF THE INVENTION

The present invention relates generally to database systems, and methods for optimizing queries in database systems. The following description is presented to enable one of ordinary skill in the art to make and use the invention and is provided in the context of a patent application and its requirements. Various modifications to the preferred implementations and the generic principles and feature described herein will be readily apparent to those skilled in the art. Thus, the present invention is not intended to be limited to the implementations shown but is to be accorded the widest scope consistent with the principles and features described herein.

Figures 1, 2:
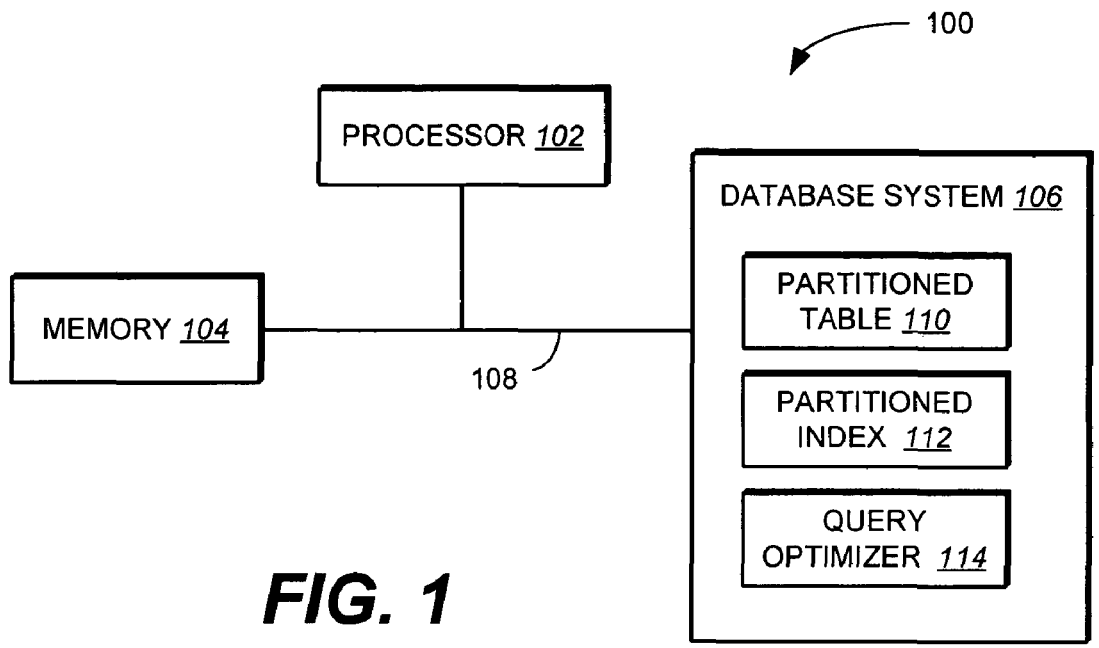
FIG. 1 is a block diagram of a computer system including a database system.
FIG. 2 illustrates a partitioned index.

FIG. 1 illustrates a computer system 100 including a processor 102, a memory 104, and a database system 106 connected by a communication bus 108. During operation of computer system 100, processor 102 processes data stored in memory 104 using computer program instructions also stored in memory 104. The data stored in memory 104 can be a part of a larger collection of organized data stored in database system 106. In one implementation, database system 106 is a relational database.

In one implementation, database system 106 includes a partitioned table 110, a partitioned index 112, and a query optimizer 114. The data stored in database system 106 can be organized into partitioned table 110, and partitioned index 112 can provide access to the data within partitioned table 110 using conventional techniques.

In one implementation, partitioned index 112 includes n columns and k partitions, where k is an integer greater than (1) and n is an integer greater than (1). Partitioned index 112 further includes a pre-determined limit key distribution that specifies limit key values associated with each of the n columns for a given k partition within partitioned index 112.

Accordingly, in response to a query on database system 106, query optimizer 114 is operable to utilize a predicate on a non-leading column of partitioned index 112 to prune one or more k partitions of partitioned index 112 based on the pre-determined limit key distribution as discussed in greater detail below. In one implementation, query optimizer 114 prunes one or more k partitions of a partitioned index (e.g., partitioned index 112) at compile time, prior to execution of the query on a database system.

FIG. 2 illustrates an example partitioned index 200. Partitioned index 200 includes three integer columns $c_1$, $c_2$, and $c_3$, and six partitions. The limit key values for each of the six partitions are shown in FIG. 2—for example, the limit key values associated with the fourth partition are (1000, 20, 5). In one implementation, a limit key value may or may not specify a maximum value of a data value for a column within a given partition based on limit values within other columns. Thus, referring to FIG. 2, for example, the following tuple (1000, 15, 100000000) will belong to partition 3, where the limit key value for column $c_3$ for partition 3 is 1. For partition 4, however, column $c_3$ has a maximum value of 5 which is the same as its limit key value. This is because of the limit values of columns $c_1$ and $c_2$ for partitions 3 and 4, that we have an upper limit for column $c_3$ in partition 4, while similar upper bound does not hold for partition 3.

Considering a query including the following predicate on partitioned index 200—($c_1=1000 \land c_2>10 \land c_3=6$)—a conventional query optimizer will qualify all partitions for scanning since conventional query optimizers take into account only the matching predicates—i.e., the predicates on columns $c_1$ and $c_2$. Unlike a conventional query optimizer, query optimizer 114 (FIG. 1) is operable to take the screening predicate—i.e., $c_3=6$—into account to prune the first, second, fourth, and sixth partitions as discussed in greater detail below. Accordingly only the third and fifth partitions of partitioned index 200 need to be scanned.

In another example, considering a query including the following predicate on partitioned index 200—($c_3=6$)—because there is a predicate missing on one or more of the leading columns $c_1$ and $c_2$, a conventional query optimizer will not prune any partitions within partitioned index 200 and, therefore, all partitions of partitioned index 200 will be scanned. In contrast, query optimizer 114 (FIG. 1) is operable to prune the second, fourth, and sixth partitions based only on the predicate on the third column of partitioned index 200. Consequently, only the first, third, and fifth partitions need to be scanned.

The above example can also be used to illustrate that partitions can be pruned based on predicates containing host variables. A host variable can take on a value that is generally unknown at compile time, which unknown value is typically determined or resolved at run-time. Thus, for example, considering the following predicate ($c_1$ op $?\land c_2$ op $?\land c_3=6$), where op is a valid SQL operator and "?" represents a host variable, query optimizer 114 (FIG. 1) is operable to prune (e.g., at compile time) the second, fourth, and sixth partitions based on the predicate without having to wait for the host variable to be resolved at run-time.

Figures 3, 4, 5:
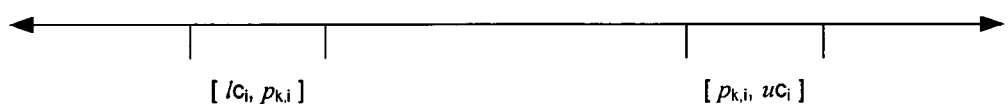
FIG. 3 illustrates a partitioned index.
FIG. 4 illustrates a partitioned index.
FIG. 5 illustrates a range for a column of a partition.

FIG. 3 illustrates another example partitioned index 300. In contrast to partitioned index 200, the second column $c_2$ of partitioned index 300 includes limit key values that vary across partitions 1-6. Consequently, considering the following predicate only on the third column of partitioned index 300—($c_3=6$)—because the limit key values of column $c_2$ vary across partitions 1-6, no bounded range can be determined for values in column $c_3$. Thus, the predicate ($c_3=6$) alone cannot be used to disqualify any partition in partitioned index 300. However, based on the distribution of limit key values in partitioned index 300 if the predicate is as follows—(c1=1000∧c2≧20∧c3=6)—then the matching predicates on columns c1-c2 (i.e., c1=1000∧c2≧20) are able to disqualify only the first partition. In this case, query optimizer 114 (FIG. 1) is further operable to disqualify partition 2 based on the screening predicate (i.e., c3=6) based on the following rules discussed below. (The use of the predicate c3=6 to more thinly slice partition 2 is the technique of introducing a pseudo partition, which is discussed in greater detail below).

General Rules for Pruning Partitions

Provided below are two rules that specify restrictions on values of limit keys within a partition that result in a bounded range for column values in a partition.

A notation for the rules will first be provided. Consider a partitioned index composed of n columns (c1, c2, ... ci−1, ci, ... cn) where the limit key values for partition k is given by (pk,1, pk,2, ... pk,i−1, pk,i, ... pk,n), such that pk,1 is the limit key value for column c1 of partition k, and pk,2 is the limit key value for column c2 of partition k and so on. Thus, referring again to FIG. 1, based on the given notation for partition 2 of partitioned index 100, p2,1 equals 1000, p2,2 equals 10 and p2,3 equals 5, and n is 3 (the total number of columns) and k is 6 (the total number of partitions).

With respect to the first rule for pruning partitions, consider a predicate on column ci (where i≠1, that is not the first column) given by ci op lit, where op is any relational operator (e.g., =, >, <, like, between, not between, in, not in, isnull, and so on) and lit is a literal. Then the predicate on column ci can be used in a pruning decision for partition k (where k≠1, that is not the first partition) if the following condition is satisfied:

$$p_{k-1,j}=p_{k,j} \text{ for } j=1 \text{ to } i-1 \qquad \text{(condition A)}$$

In this case, the partition k provides a range $$(p_{k-1,i}, p_{k,i}] \qquad \text{(range eq. for condition A)}$$

for column $c_i$. Accordingly, the range specified by the predicate $c_i$ op lit for column $c_i$ can be evaluated to determine an intersection, if any, with the range given by $(p_{k-1,i}, p_{k,i}]$.

For example, consider the limit key distribution within partitioned index 400 of FIG. 4, and a predicate on the third column—c3≧5. Based on the limit key values in partitions 1 and 2, p1,1=1, p1,2=2, p1,3=4 and p2,1=1, p2,2=2 and p2,3=6. Accordingly, the limit key values in partition 2 satisfy condition A above—i.e., p1,1=p2,1=1 and p2,1=p2,2=2. Thus, according to the range equation given above, values for column c3 in partition 2 are bounded by (p1,3, p2,3] or (4, 6]. Similarly, the limit key values in partitions 3, 5 and 6 satisfy condition A above. That is, values for column c3 in partition 3 are bounded by (6, 8], values for column c3 of partition 5 are bounded by (6, 12], and values for column c3 in partition 6 are bounded by (12, 14]. Partitions 2, 3, 5, and 6 can, therefore, be pruned by query optimizer 114 (FIG. 1) depending on whether the range [5, +∞) specified by the predicate c3≧5 intersects any of the bounded ranges above.

Not all limit key distributions for partitions will satisfy condition A above. However, there are cases where even though the limit keys do not satisfy condition A, query optimizer 114 (FIG. 1) is operable to infer the existence of a partition (based on one or more predicates) having limit key values that satisfy condition A. Such inferred partitions will be referred to herein as pseudo-partitions.

With respect to the example discussed above in connection with FIG. 4, suppose there is another predicate on the second column—c2=3. A pseudo-partition 4' can be inserted before partition 4, in which partition 4' includes limit key values of (1, 3, 5). With pseudo-partition 4' inserted into partitioned index 400, partition 4 satisfies condition A above and partition 4 can, therefore, be pruned based on whether a predicate intersects a bounded range determined by the range equation above for partition 4.

Referring again to the limit key distribution within partitioned index 400, generally condition A cannot be applied to partition 1. However, based on the following predicate—c1=1∧c2≧2, then a pseudo-partition 1' can be inserted before partition 1, in which partition 1' includes limit key values of (1, 2, −∞). With this pseudo-partition in place, partition 1 satisfies condition A above and column c3 of partition 1 will be bounded by the values (−∞, 4] according to the range equation for condition A. Accordingly, the literals within the predicates can be used as corresponding limit key values within a pseudo-partition.

With respect to the second rule for pruning partitions, consider a predicate on column ci given by ci op lit, where op is any relational operator and lit is a literal, and further consider a succeeding operator defined on the domain for ci. For example, if the domain for ci includes integer values, then the succeeding operator is defined by succ(m)=m+1. On the other hand, if there is a constraint on an integer column such that the integer column can only have values that belong to 1, 4, and 7, then in this case succ(1)=4, and succ(4)=7). Also, assuming that the lower bound (lci) and upper bound (uci) for values that ci can have are known. In such a case, a predicate on column ci will provide an opportunity for pruning partition k if the following conditions are true for the i−1 preceding limit key values:

$$p_{k-1,j}=p_{k,j} \text{ for } j=1 \text{ to } i-2 \text{ and } \text{succ}(p_{k-1,i-1})=p_{k,i-1} \qquad \text{(condition B)}$$

In this case, the partition k provides a range $$(p_{k-1,i}, u_{ci}] \cup [l_{ci}, p_{k,i}] \qquad \text{(range eq. for condition B)}$$

for column $c_i$. Accordingly, the range specified by the predicate $c_i$ op lit for column $c_i$ can be evaluated to determine an intersection, if any, with the range given by $(p_{k-1,i}, u_{ci}] \cup [l_{ci}, p_{k,i}]$. FIG. 5 shows a range diagram 500 that illustrates the ranges for column $c_i$ specified by the range equation for condition B. The range equation for condition B does not assume that $p_{k-1,i} > p_{k,i}$, rather it is FIG. 5 that assumes this inequality. Because this inequality is assumed to hold, the range equation for condition B, which is drawn in FIG. 5 shows a gap between the two intervals. Thus if column $c_i$ has a predicate value that falls in the gap shown in FIG. 5, we can eliminate partition k. On the other hand if the inequality $p_{k-1,i} > p_{k,i}$ does not hold, the range equation for condition B will still continue to provide the range of valid $c_i$ column values for partition k, but in this case, the range equation for condition B will reduce to $[l_{ci}, u_{ci}]$, that is partition k can contain all legitimate values for column $c_i$ and there is no opportunity for pruning partition k based on a predicate on column $c_i$.

Figures 6, 7:
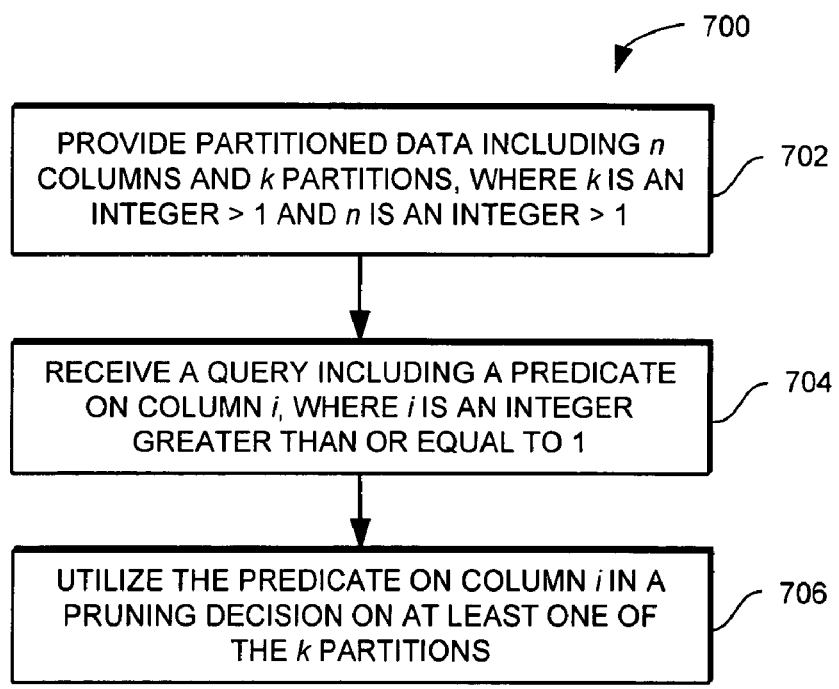
FIG. 6 illustrates a partitioned index.
FIG. 7 illustrates a method for pruning partitions.
Like reference symbols in the various drawings indicate like elements.

For example, consider the limit key distribution within partitioned index 600 of FIG. 6. In partitioned index 600, columns c1, c2, and c3 represent year, month, and day, respectively. Applying condition B to partition 3, column c2 satisfies the succeeding operator equation of condition B—i.e., succ(p2,2)=p3,2. Accordingly, the range specified (by the range equation for condition B) for column c3 of partition 3 is (30, ∞) and [1, 15]. Because column c3 represents days in a month, the specified range can be modified to (30, 31] and [1, 15].

Referring again to FIG. 5, it is clear that column ci cannot have a value that lies within the gap—i.e., (pk,i, pk−1,i)—between the two intervals specified by the range equation for condition B. Thus, predicates on columns other than ci do not need to be known in order to make a pruning decision. For example, based on the following predicate—cj op ?∧ci=lit—where the values of the literals for columns cj are unknown, lit belongs to the interval (pk,i, pk−1,i), and where condition B is satisfied including the inequality pk−1,i>pk,i, then partition k can be pruned. Accordingly partition pruning can take place during compile time when host variables within a predicate remain unresolved.

If the assumed inequality pk−1,i>pk,i does not hold for condition B, then partitions can still be pruned based on the following cases. Case 1—if ci−1≠pk−1,i−1∧ci−1≠pk,i, then partition k can be pruned. Case 2—if ci−1=pk−1,i−1, then the range available for ci in partition k is (pk−1, uci]. If ci is not within the range of (pk−1, uci]—i.e., if ci∉(pk−1, uci]—then partition k can be pruned. Case 3—similarly if ci−1=pk,i−1 then the range available for ci in partition k is [lci, pk,i]. If ci is not within the range of [lci, pk,i]—i.e., if ci∉[lci, pk,i]—then partition k can be pruned.

Join Predicates

The rules expressed above can be applied with join predicates to prune partitions. For example, consider a table with three columns, c1, c2, c3, which columns also form the partitioning columns for an index. Also, consider join predicates (c1=a1∧c2≧a2), where a1, a2 are columns provided by other tables in the join. If t1 is the inner table in the join, then the join predicates on c1 and c2 will act as matching predicates during run-time since specific values for a1 and a2 will be available at that time and, therefore, a conventional loop join implementation will prune partitions based on these join predicates. However, if the join predicates were in the form of (c1=a1∧c3≧a3), a conventional nested loop join implementation will not prune partitions based on the predicate c3≧a3. In contrast, using the rules discussed above, the predicates (c1=a1∧c3≧a3) can be used to prune partitions.

To explain this further, consider a join between table t1 and t2. Let the columns of t2 be $(a_1, a_2, a_3)$ and let the columns of t1 be $(c_1, c_2, c_3)$. Consider a join predicate $c_1=a_1 \wedge c_2 \geq a_2$ between t1 and t2. Let t1 have a partitioned index using column $(c_1, c_2, c_3)$. Let t1 also be the inner side of the join, which means that for every row scanned from t2 and every pair $(a_1^{val1}, a_2^{val1})$ of values of columns $a_1$ and $a_2$ that we thus obtain, we will probe table t1 and try to obtain rows that satisfy the join predicate $c_1=a_1^{val1} \wedge c_2 \geq a_{val1}$. Notice in this re-written join predicate $a_1^{val1}, a_2^{val1}$ are fixed and, therefore, the join predicate case reduces to the table predicate case and we can use our previous results to see if we can prune any partitions of t1 based on $c_1=a_1^{val1} \wedge c_2 \geq a_2^{val1}$. When we scan another row of t2 we may obtain a different pair $(a_1^{val2}, a_2^{val2})$ of values of columns $a_1$ and $a_2$. In this case the join predicate will reduce to $c_1=a_1^{val2} \wedge c_2 \geq a_2^{val2}$ and we can again apply the techniques developed before. Because of the need to apply the same logic (that of condition A and B and their range equations as well as the pseudo-partition technique) over and over again, a technique is provided for compiling the information that is captured in limit key distribution so that conditions A and B are pre-compiled, as discussed in greater detail below. Notice because conditions A and B extend the ability to prune partitions based on predicates that are not defined on leading columns or are not matching predicates we can apply the above techniques to join predicate of the form $c_1=a_1 \wedge c_3 \geq a_3$. This is just an example, the techniques discussed above can apply to other forms of join predicates.

FIG. 7 illustrates a method for pruning partitions during a query of a database. Partitioned data is provided (e.g., a database system 106) including n columns and k partitions, in which k is an integer greater than (1) and n is an integer greater than (1) (step 702). In one implementation, the partitioned data is in the form of a partitioned index (e.g., partitioned index 112) of a relational database. The partitioned data can also be in the form of a partitioned table (e.g., partitioned table 110) of a relational database. In one implementation, the partitioned data includes a limit key value associated with each of the n columns for a given k partition. The limit key values may or may not specify (or represent) maximum values of a data value for a column within a given partition. Since the same rules—i.e., conditions A and B—need to be applied for various predicates, the rules can be pre-compiled in the following fashion (to avoid having to apply the same conditions A and B over and over again). Given a limit key distribution for k partitions and n columns, in one implementation a matrix of dimension (k×n) is created, where the (i,j) cell of the matrix contains a valid range that can be obtained from the range equation for condition A or B that is applicable to partition i and column $c_j$. If a valid range for partition i and column $c_j$ cannot be obtained, then the (i,j) cell in the matrix will remain empty. Also the matrix could be dynamically augmented with extra rows, when a partition can be more thinly sliced a partition based on a pseudo-partition.

Thus, given a predicate of the form $c_1$ op lit_1 $\wedge c_2$ op lit_2 $\wedge \ldots \wedge c_n$ op lit_n and a limit key distribution the matrix described above can be formed using the limit key distribution. Then for each predicate of the form $c_i$ op lit_i a scan through the i-th column of the matrix is performed to see if there are any partitions that can be pruned. A set of partitions is created that need to be scanned for satisfying $c_i$ op lit_i. Let this set of partitions be P_i. Also, any pseudo-partitions can be added which would mean adding one or more rows to this matrix, depending on how many partitions can be thinly sliced. For the next predicate $c_{i+1}$ op lit_(i+1), a scan is performed through the matrix (that is, going down column i+1 of the matrix) that has been augmented possibly with pseudo-partitions derived from $c_k$ op lit_k for 1<=k<=i. At the end, a new partition P_(i+1) is created that needs to be scanned for satisfying $c_{i+1}$ op lit_(i+1) and, also, any new pseudo-partitions are added that can be derived from $c_{i+1}$ op lit_(i+1) to the matrix. After $c_n$ op lit_n has been processed, all the partition sets P_i are intersected to determine the final partition set that needs to be scanned to satisfy the predicate where 1<=i<=n. At the end of this process (in one implementation), the pseudo-partitions are removed, because they might not be valid for a different set of predicates. The base matrix by itself still remains valid since the base matrix only incorporates limit key distribution information which of course does not change within a query. Note that the above algorithm scanned through $c_1$ op lit_1 to $c_n$ op lit_n, that is predicates were visited whose columns are in the same order as the partitioning keys. If these predicates were visited in an arbitrary order, a second pass will have to be performed through all the predicates. Because, if $c_{i+1}$ op lit_i+1 were visited before $c_i$ op lit_i, then $c_i$ op lit_i may add a pseudo-partition to the matrix that will not be taken advantage of by $c_{i+1}$ op lit_i+1. To prevent this, a second pass through the matrix can be performed.

For the join predicate example given above, notice that after we have used the predicate $c_1=a_1^{val1} \wedge c_2 \geq a_2^{val1}$ to obtain a set of partitions of t1 that need to be scanned using the matrix and any new pseudo-partition that might have been added to the matrix using $c_1=a_1^{val1} \wedge c_2 \geq a_2^{val1}$, the pseudo-partitions from the matrix must be removed before the next predicate $c_1=a_1^{val2} \wedge c_2 \geq a_2^{val2}$ is processed. This is because the pseudo-partitions that are derived under $c_1=a_1^{val1} \wedge c_2 \geq a_2^{val1}$ are not valid for those derived under $c_1=a_1^{val2} \wedge c_2 \geq a_2^{val2}$.

A query is received (e.g., by database system 106) including a predicate on column i, where i is an integer greater than or equal to (1) (step 704). In one implementation, the predicate represents a screening predicate or a stage 1 predicate. Further, in one implementation, one or more predicates are received in which there is not a predicate on the leading column of the partitioned data. For example, referring back to FIG. 2, predicates can be received on columns c2 and c3, and not on column c1 as follows—(c2≧10∧c3=6).

The predicate on column i is utilized (e.g., by query optimizer 114) in a pruning decision on at least one of the k partitions of the partitioned data (step 706). In one implementation, conditions A and B discussed above are implemented in a decision on whether a particular partition k of the partitioned data can be disqualified from being scanned. In addition, pseudo-partitions having limit key values corresponding to literals of one or more predicates can be inferred to provide bounded ranges for column values which satisfy either condition A or condition B. For example, consider two partitions k and k−1 with corresponding limit key values. If condition A hold true for the first i−1 columns, then based on the following predicate (ci=pk,i) the equalities in condition A can be extended in one more column to give a bounded range for column ci+1. Also, if a predicate exists on the next column— e.g., ci+1=pk,i+1—then the equalities in condition A can be extended yet another column to give a bounded range for column ci+2. Similarly, predicate values can be used to satisfy condition B. For example, if we have predicate ci op lit_i then if succ(lit_i)=$P_{k+1,i}$, then condition B holds for columns 1 to i for partitions k and k+1, and we can possibly find an opportunity for pruning partitions.

If one or more predicates received in a query include host variables, then a decision for pruning one or more partitions can wait until the host variables are resolved to produce a list of partitions that need to be scanned. Once the host variables are resolved (e.g., at run-time) then one or more pseudo-partitions can be inferred and added to a given set of partitioned data as applicable. In one implementation, is a query includes one or more host variables, the decision for pruning one or more partitions can still take place during compile time, as discussed above.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium such as electrical, electronic, electromagnetic or optical signals that carry digital data streams through the various computer-based networks and communication interfaces by carrying digital data to and from computer systems as exemplary forms of carrier waves transporting the information. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RJW) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Various implementations for executing a query on data that has been partitioned have been described. Nevertheless, one or ordinary skill in the art will readily recognize that there that various modifications may be made to the implementations, and any variation would be within the spirit and scope of the present invention. For example, the steps of methods discussed above can be performed in a different order to achieve desirable results. Accordingly, many modifications may be made by one of ordinary skill in the art without departing from the spirit and scope of the following claims.

What is claimed is:

1. A computer-implemented system for executing a query on data in a database and organized into a partitioned table that has been partitioned into a plurality of partitions and is accessible by a partitioned index, wherein the computer performs the following functions comprising:

providing partitioned data including one or more columns and the plurality of partitions, the partitioned data including a pre-determined limit key distribution providing limit key values associated with each column for a given partition within the partitioned index;

receiving a query including a predicate on one of the one or more columns of the partitioned data;

utilizing a query optimizer and the predicate on the one of the one or more columns in a pruning decision on at least one of the plurality of partitions in relation to the pre-determined limit key distribution associated with the plurality of partitions, providing a capability to infer a pseudo-partition into the partitioned index having limit key values in relation to one or more pre-determined conditions by introducing a removable partition subset, and inferring a pseudo-partition by introducing a removable partition subset having one or more limit key values based on the predicate; and generating a bounded range for column values in a given partition based on the limit key values of the inferred pseudo-partition using the introduced partition subset.

2. The computer-implemented system of claim 1, wherein the predicate on the one of the one or more columns is utilized in a pruning decision on a given partition if one or more limit key values associated with the given partition is equal to one or more limit key values associated with a second partition of the plurality of partitions.

3. The computer-implemented system of claim 2, wherein the given partition provides at least one bounded range value for values in the one of the one or more columns.

4. The computer-implemented system of claim 1, wherein providing partitioned data includes providing a partitioned index or a partitioned table associated with a relational database.

5. The computer-implemented system of claim 1, wherein:
receiving a query includes receiving a query including a predicate having a host variable which is unresolved; and utilizing the predicate includes utilizing the predicate in a pruning decision at compile time to prune at least one of the plurality of partitions prior to resolving the unresolved host variable at the time of compilation.

6. A computer readable storage medium containing program instructions for executing a query on data in a database that has been partitioned into a plurality of partitions and is accessible by a partitioned index, wherein execution of program instructions by one or more processors of a computer causes the one or more processors to carry out the steps of:
providing partitioned data including one or more columns and the plurality of partitions, the partitioned data including a pre-determined limit key distribution providing limit key values associated with each column for a given partition within the partitioned index;
receiving a query including a predicate on one of the one or more columns of the partitioned data;
utilizing the predicate on the one of the one or more columns in a pruning decision on at least one of the one or more partitions in relation to the pre-determined limit key distribution associated with the plurality of partitions,
providing a capability to infer a pseudo-partition into the partitioned index having limit key values in relation to one or more pre-determined conditions by introducing a removable partition subset, and
inferring a pseudo-partition by introducing a removable partition subset having one or more limit key values based on the predicate; and; generating a bounded range for column values in a given partition based on the limit key values of the inferred pseudo-partition using the introduced partition subset.

7. The computer readable storage medium of claim 6, wherein the predicate on the one of the one or more columns is utilized in a pruning decision on a given partition if one or more limit key values associated with the given partition is equal to one or more limit key values associated with a second partition of the plurality of partitions.

8. The computer readable storage medium of claim 7, wherein the given partition provides at least one bounded range value for values in the one of the one or more columns.

9. The computer readable storage medium of claim 6, wherein providing partitioned data includes providing a partitioned index or a partitioned table associated with a relational database.

10. The computer readable storage medium of claim 6, wherein:
receiving a query includes receiving a query including a predicate having a host variable which is unresolved; and utilizing the predicate includes utilizing the predicate in a pruning decision at compile time to prune at least one of the plurality of partitions prior to resolving the unresolved host variable at the time of compilation.

* * * * *